US012536659B2

(12) United States Patent
Ichinose

(10) Patent No.: US 12,536,659 B2
(45) Date of Patent: Jan. 27, 2026

(54) MEDICAL IMAGE ANALYSIS APPARATUS, MEDICAL IMAGE ANALYSIS METHOD, AND MEDICAL IMAGE ANALYSIS PROGRAM

(71) Applicant: FUJIFILM Corporation, Tokyo (JP)

(72) Inventor: Akimichi Ichinose, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 307 days.

(21) Appl. No.: 18/479,118

(22) Filed: Oct. 2, 2023

(65) Prior Publication Data
US 2024/0029251 A1 Jan. 25, 2024

Related U.S. Application Data

(63) Continuation of application No. PCT/JP2022/013692, filed on Mar. 23, 2022.

(30) Foreign Application Priority Data

Apr. 5, 2021 (JP) .................................. 2021-064397
Dec. 22, 2021 (JP) .................................. 2021-208524

(51) Int. Cl.
*G06T 7/00* (2017.01)

(52) U.S. Cl.
CPC .. *G06T 7/0012* (2013.01); *G06T 2207/20081* (2013.01); *G06T 2207/20104* (2013.01)

(58) Field of Classification Search
CPC ......... G06T 7/0012; G06T 2207/20081; G06T 2207/20104
USPC .......................................................... 382/128
See application file for complete search history.

(56) References Cited

U.S. PATENT DOCUMENTS

| 10,861,606 | B2 | 12/2020 | Kawagishi |
| 11,600,385 | B2* | 3/2023 | Meguro ............ A61B 1/000096 |
| 12,303,197 | B2* | 5/2025 | Leahy ...................... G06T 7/571 |
| 2012/0254101 | A1 | 10/2012 | Kawagishi |
| 2020/0124691 | A1 | 4/2020 | Douglas et al. |
| 2020/0143538 | A1* | 5/2020 | Kamon ............ A61B 1/000094 |
| 2020/0211692 | A1 | 7/2020 | Kalafut et al. |
| 2021/0224957 | A1* | 7/2021 | Iwase ........................ G06T 5/70 |

(Continued)

FOREIGN PATENT DOCUMENTS

| JP | 2013172940 | 9/2013 |
| JP | 2017033257 | 2/2017 |

(Continued)

OTHER PUBLICATIONS

"International Search Report (Form PCT/ISA/210) of PCT/JP2022/013692", mailed on May 17, 2022, with English translation thereof, pp. 1-6.

(Continued)

*Primary Examiner* — Allen H Nguyen
(74) *Attorney, Agent, or Firm* — JCIPRNET

(57) ABSTRACT

A medical image analysis apparatus extracts a region having one or more preset physical features from a medical image, performs control to display information indicating the extracted region, receives information indicating a selected region from among the extracted regions, refers to data in which physical features are associated with disease names, and generates a comment on findings using the disease name associated with the physical features of the selected region.

10 Claims, 14 Drawing Sheets

(56) References Cited

U.S. PATENT DOCUMENTS

2022/0028510 A1    1/2022   Nakamura et al.
2022/0207722 A1*   6/2022   Kim ..................... G06T 7/0012

FOREIGN PATENT DOCUMENTS

| WO | 2017221537 | 12/2017 |
| WO | 2019008942 | 1/2019 |
| WO | 2020209382 | 10/2020 |

OTHER PUBLICATIONS

"Written Opinion of the International Searching Authority (Form PCT/ISA/237) of PCT/JP2022/013692", mailed on May 17, 2022, with English translation thereof, pp. 1-10.
"Notice of Reasons for Refusal of Japan Counterpart Application", issued on Nov. 11, 2025, with English translation thereof, p. 1-p. 10.

* cited by examiner

| PART | DIAGNOSIS NAME | FINDINGS | RELEVANT PART | RELEVANT DIAGNOSIS NAME |
|---|---|---|---|---|
| LUNG FIELD | LUNG NODULE | SPICULA+ | HILAR REGION | LYMPHOMATOSIS+ |
| LUNG FIELD | LUNG NODULE | LUNG METASTASIS | LUNG FIELD | LYMPHOMATOSIS+ |
| ... | ... | ... | ... | ... |

18 mm-SIZED SOLID NODULE IS FOUND IN RIGHT LUNG S3. MARGIN IS IRREGULAR AND SOME SPICULAS ARE FOUND. PRIMARY LUNG CANCER IS SUSPECTED.

MEDICAL IMAGE ANALYSIS APPARATUS, MEDICAL IMAGE ANALYSIS METHOD, AND MEDICAL IMAGE ANALYSIS PROGRAM

CROSS-REFERENCE TO RELATED APPLICATIONS

This application is a continuation of International Application No. PCT/JP2022/013692, filed on Mar. 23, 2022, which claims priority from Japanese Patent Application No. 2021-064397, filed on Apr. 5, 2021 and Japanese Patent Application No. 2021-208524, filed on Dec. 22, 2021. The entire disclosure of each of the above applications is incorporated herein by reference.

BACKGROUND

1. Technical Field

The present disclosure relates to a medical image analysis apparatus, a medical image analysis method, and a medical image analysis program.

2. Description of the Related Art

WO2020/209382A discloses a technology of detecting a plurality of findings representing features of an abnormal shadow included in a medical image, specifying at least one finding to be used for creating an interpretation report from the detected findings, and creating an interpretation report using the specified finding.

SUMMARY

Incidentally, there is room for improvement in the technology disclosed in WO2020/209382A from the viewpoint of improving the accuracy of analysis results of a region of interest.

The present disclosure has been made in view of the above circumstances, and an object of the present disclosure is to provide a medical image analysis apparatus, a medical image analysis method, and a medical image analysis program capable of improving the accuracy of analysis results of a region of interest.

According to an aspect of the present disclosure, there is provided a medical image analysis apparatus comprising at least one processor, in which the processor is configured to: perform a first analysis process regarding a plurality of regions of interest included in a medical image; receive an input for a first region of interest among the plurality of regions of interest; perform a second analysis process regarding a second region of interest related to the first region of interest based on the input; and output an analysis result of the second region of interest.

In addition, in the medical image analysis apparatus according to the aspect of the present disclosure, the processor may be configured to: receive, as the input, selection of one analysis result from among a plurality of analysis results of the first analysis process regarding the first region of interest; and perform the second analysis process regarding the second region of interest for which an analysis result related to the one analysis result is obtained.

In addition, in the medical image analysis apparatus according to the aspect of the present disclosure, the processor may be configured to: receive, as the input, a comment on findings regarding the first region of interest; select one analysis result from among a plurality of analysis results of the first analysis process regarding the first region of interest based on the comment on findings; and perform the second analysis process regarding the second region of interest for which an analysis result related to the one analysis result is obtained.

In addition, in the medical image analysis apparatus according to the aspect of the present disclosure, the processor may be configured to perform, as the second analysis process, a process of correcting a degree of certainty of the analysis result related to the one analysis result among a plurality of analysis results obtained by the first analysis process regarding the second region of interest.

In addition, in the medical image analysis apparatus according to the aspect of the present disclosure, the processor may be configured to perform, as the second analysis process, an analysis process regarding the second region of interest based on a partial image including the second region of interest of the medical image, the one analysis result, and a trained model trained in advance using training data including a partial image for learning and an analysis result of a region of interest included in the partial image for learning.

In addition, in the medical image analysis apparatus according to the aspect of the present disclosure, the processor may be configured to, in a case where a plurality of analysis results related to the one analysis result are present, select one analysis result from among the plurality of analysis results related to the one analysis result based on a co-occurrence probability of the one analysis result and each of the plurality of analysis results related to the one analysis result.

In addition, in the medical image analysis apparatus according to the aspect of the present disclosure, the processor may be configured to perform, as the second analysis process, the first analysis process by changing an analysis parameter for an analysis result related to an analysis result of the first region of interest.

In addition, in the medical image analysis apparatus according to the aspect of the present disclosure, the analysis result may be a name, finding, comment on findings, or diagnosis name of the region of interest.

In addition, in the medical image analysis apparatus according to the aspect of the present disclosure, the processor may be configured to, in a case where a result of the second analysis process regarding the second region of interest is different from a result of the first analysis process, provide a notification that the result of the second analysis process is different from the result of the first analysis process.

In addition, in the medical image analysis apparatus according to the aspect of the present disclosure, the processor may be configured to determine the second region of interest related to the first region of interest based on the input, and perform the second analysis process regarding the determined second region of interest.

In addition, in the medical image analysis apparatus according to the aspect of the present disclosure, the processor may be configured to: determine the second regions of interest related to each of the plurality of regions of interest prior to receiving the input; select the second region of interest related to the first region of interest from among the second regions of interest determined for each of the plurality of regions of interest based on the input; and perform the second analysis process regarding the selected second region of interest.

In addition, according to another aspect of the present disclosure, there is provided a medical image analysis method executed by a processor provided in a medical image analysis apparatus, the method comprising: performing a first analysis process regarding a plurality of regions of interest included in a medical image; receiving an input for a first region of interest among the plurality of regions of interest; performing a second analysis process regarding a second region of interest related to the first region of interest based on the input; and outputting an analysis result of the second region of interest.

In addition, according to another aspect of the present disclosure, there is provided a medical image analysis program for causing a processor provided in a medical image analysis apparatus to execute: performing a first analysis process regarding a plurality of regions of interest included in a medical image; receiving an input for a first region of interest among the plurality of regions of interest; performing a second analysis process regarding a second region of interest related to the first region of interest based on the input; and outputting an analysis result of the second region of interest.

In addition, according to another aspect of the present disclosure, there is provided a medical image analysis apparatus comprising at least one processor, in which the processor is configured to: perform an analysis process regarding a region of interest included in a medical image; receive an input for correcting an analysis result of the region of interest; and perform the analysis process by changing an analysis parameter for an analysis result related to the corrected analysis result based on the input.

In addition, according to another aspect of the present disclosure, there is provided a medical image analysis method executed by a processor provided in a medical image analysis apparatus, the method comprising: performing an analysis process regarding a region of interest included in a medical image; receiving an input for correcting an analysis result of the region of interest; and performing the analysis process by changing an analysis parameter for an analysis result related to the corrected analysis result based on the input.

In addition, according to another aspect of the present disclosure, there is provided a medical image analysis program for causing a processor provided in a medical image analysis apparatus to execute: performing an analysis process regarding a region of interest included in a medical image; receiving an input for correcting an analysis result of the region of interest; and performing the analysis process by changing an analysis parameter for an analysis result related to the corrected analysis result based on the input.

According to the aspects of the present disclosure, it is possible to improve the accuracy of analysis results of a region of interest.

DETAILED DESCRIPTION

Hereinafter, form examples for implementing a technology of the present disclosure will be described in detail with reference to the drawings.

First Embodiment

First, a configuration of a medical information system 1 to which a medical image analysis apparatus according to the disclosed technology is applied will be described with reference to FIG. 1. The medical information system 1 is a system for performing imaging of a diagnosis target part of a subject and storing of a medical image acquired by the imaging based on an examination order from a doctor in a medical department using a known ordering system. In addition, the medical information system 1 is a system for performing interpretation of a medical image and creation of an interpretation report by a radiologist, and viewing the interpretation report and detailed observation of the medical image to be interpreted by a doctor of a medical department that is a request source.

Figure 1:
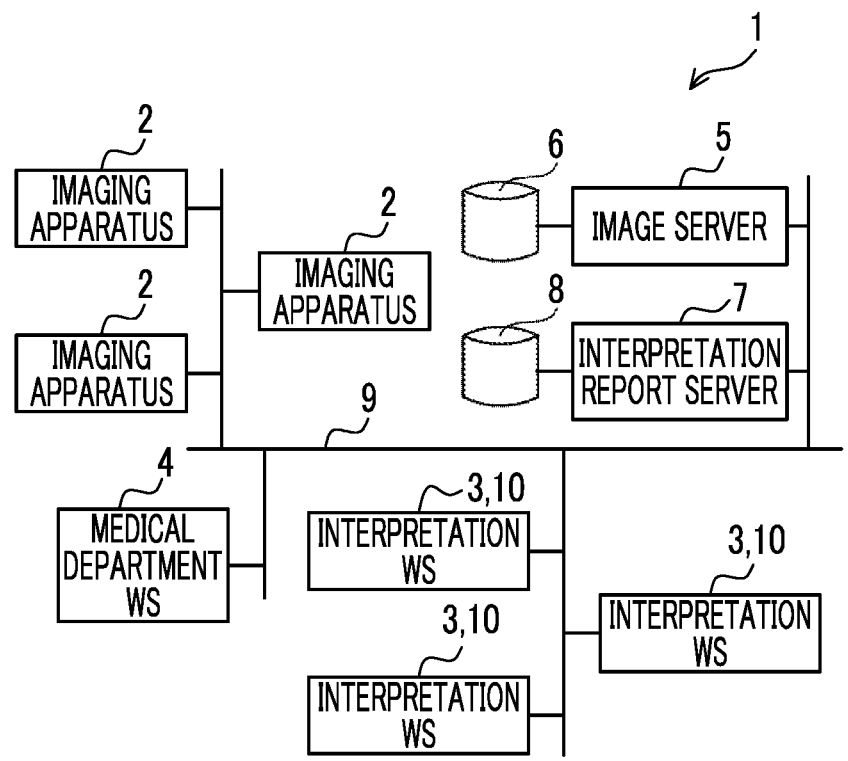
FIG. 1 is a block diagram showing a schematic configuration of a medical information system.

As shown in FIG. 1, the medical information system 1 according to the present embodiment includes a plurality of imaging apparatuses 2, a plurality of interpretation workstations (WS) 3 that are interpretation terminals, a medical department WS 4, an image server 5, an image database (DB) 6, an interpretation report server 7, and an interpretation report DB 8. The imaging apparatus 2, the interpretation WS 3, the medical department WS 4, the image server 5, and the interpretation report server 7 are connected to each other via a wired or wireless network 9 in a communicable state. In addition, the image DB 6 is connected to the image server 5, and the interpretation report DB 8 is connected to the interpretation report server 7.

The imaging apparatus 2 is an apparatus that generates a medical image showing a diagnosis target part of a subject by imaging the diagnosis target part. The imaging apparatus 2 may be, for example, a simple X-ray imaging apparatus, an endoscope apparatus, a computed tomography (CT) apparatus, a magnetic resonance imaging (MRI) apparatus, a positron emission tomography (PET) apparatus, and the like. A medical image generated by the imaging apparatus 2 is transmitted to the image server 5 and is saved therein.

The medical department WS 4 is a computer used by a doctor in the medical department for detailed observation of a medical image, viewing of an interpretation report, creation of an electronic medical record, and the like. In the medical department WS 4, each process such as creating an electronic medical record of a patient, requesting the image server 5 to view an image, and displaying a medical image received from the image server 5 is performed by executing a software program for each process. In addition, in the medical department WS 4, each process such as automatically detecting or highlighting suspected disease regions in the medical image, requesting to view an interpretation report from the interpretation report server 7, and displaying the interpretation report received from the interpretation report server 7 is performed by executing a software program for each process.

The image server 5 incorporates a software program that provides a function of a database management system (DBMS) to a general-purpose computer. In a case where the image server 5 receives a request to register a medical image from the imaging apparatus 2, the image server 5 prepares the medical image in a format for a database and registers the medical image in the image DB 6.

Image data representing the medical image acquired by the imaging apparatus 2 and accessory information attached to the image data are registered in the image DB 6. The accessory information includes information such as an image identification (ID) for identifying individual medical images, a patient ID for identifying a patient who is a subject, an examination ID for identifying examination content, and a unique identification (UID) assigned to each medical image, for example. In addition, the accessory information includes information such as an examination date when a medical image was generated, an examination time, the type of imaging apparatus used in the examination for acquiring the medical image, patient information (for example, a name, an age, and a gender of the patient), an examination part (that is, an imaging part), and imaging information (for example, an imaging protocol, an imaging sequence, an imaging method, imaging conditions, and whether or not a contrast medium is used), and a series number or collection number when a plurality of medical images are acquired in one examination. In addition, in a case where a viewing request from the interpretation WS 3 is received through the network 9, the image server 5 searches for a medical image registered in the image DB 6 and transmits the searched for medical image to the interpretation WS 3 that is a request source.

The interpretation report server 7 incorporates a software program for providing a function of DBMS to a general-purpose computer. In a case where the interpretation report server 7 receives a request to register an interpretation report from the interpretation WS 3, the interpretation report server 7 prepares the interpretation report in a format for a database and registers the interpretation report in the interpretation report database 8. Further, in a case where the request to search for the interpretation report is received, the interpretation report is searched for from the interpretation report DB 8.

In the interpretation report DB 8, for example, an interpretation report is registered in which information, such as an image ID for identifying a medical image to be interpreted, a radiologist ID for identifying an image diagnostician who performed the interpretation, a lesion name, position information of a lesion, findings, and a degree of certainty of the findings, is recorded.

The network 9 is a wired or wireless local area network that connects various apparatuses in a hospital to each other. In a case where the interpretation WS 3 is installed in another hospital or clinic, the network 9 may be configured to connect local area networks of respective hospitals through the Internet or a dedicated line. In any case, it is preferable that the network 9 has a configuration capable of realizing high-speed transmission of medical images such as an optical network.

The interpretation WS 3 requests the image server 5 to view a medical image, performs various types of image processing on the medical image received from the image server 5, displays the medical image, performs an analysis process on the medical image, highlights the medical image based on an analysis result, and creates an interpretation report based on the analysis result. In addition, the interpretation WS 3 supports creation of an interpretation report, requests the interpretation report server 7 to register and view an interpretation report, displays the interpretation report received from the interpretation report server 7, and the like. The interpretation WS 3 performs each of the above processes by executing a software program for each process. The interpretation WS 3 encompasses a medical image analysis apparatus 10 to be described later, and in the above processes, processes other than those performed by the medical image analysis apparatus 10 are performed by a well-known software program, and therefore the detailed description thereof will be omitted here. In addition, processes other than the processes performed by the medical image analysis apparatus 10 may not be performed in the interpretation WS 3, and a computer that performs the processes may be separately connected to the network 9, and in response to a processing request from the interpretation WS 3, the requested process may be performed by the computer. Hereinafter, the medical image analysis apparatus 10 encompassed in the interpretation WS 3 will be described in detail.

Figure 2:
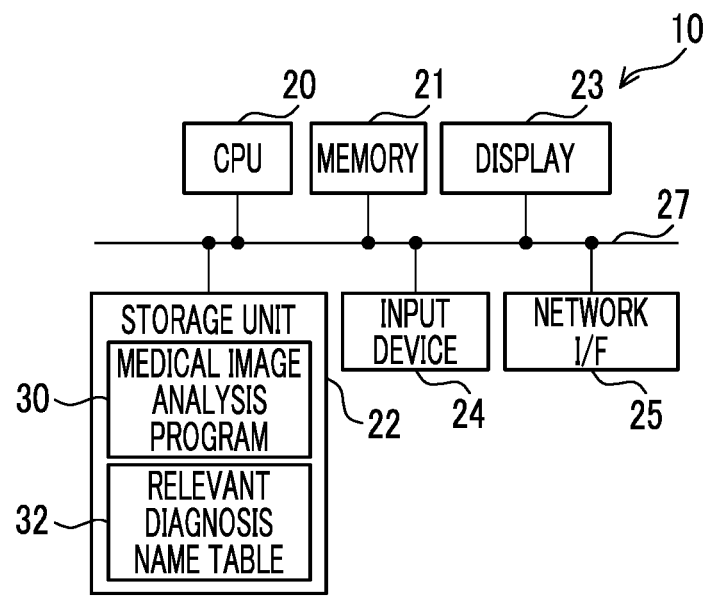
FIG. 2 is a block diagram showing an example of a hardware configuration of a medical image analysis apparatus.

Next, a hardware configuration of the medical image analysis apparatus 10 according to the present embodiment will be described with reference to FIG. 2. As shown in FIG. 2, the medical image analysis apparatus 10 includes a central processing unit (CPU) 20, a memory 21 as a temporary storage area, and a non-volatile storage unit 22. Further, the medical image analysis apparatus 10 includes a display 23 such as a liquid crystal display, an input device 24 such as a keyboard and a mouse, and a network interface (I/F) 25 connected to the network 9. The CPU 20, the memory 21, the storage unit 22, the display 23, the input device 24, and the network OF 25 are connected to a bus 27.

The storage unit 22 is realized by a hard disk drive (HDD), a solid state drive (SSD), a flash memory, or the like. A medical image analysis program 30 is stored in the storage unit 22 as a storage medium. The CPU 20 reads out the medical image analysis program 30 from the storage unit 22, loads the read medical image analysis program 30 into the memory 21, and executes the loaded medical image analysis program 30.

Figure 3:
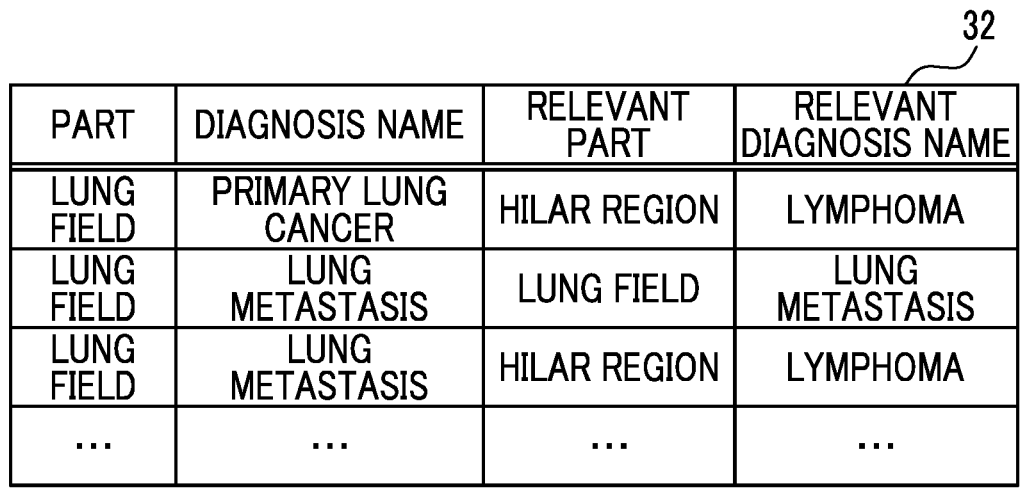
FIG. 3 is a diagram showing an example of a relevant diagnosis name table.

In addition, a relevant diagnosis name table 32 is stored in the storage unit 22. FIG. 3 shows an example of the relevant diagnosis name table 32. As shown in FIG. 3, in the relevant diagnosis name table 32, a diagnosis name and a diagnosis name related to the diagnosis name are associated with each other. For example, a lymphoma of a hilar region is associated with a primary lung cancer in the lung field. This is because there is a relationship between the primary lung cancer in the lung field and the lymphoma in the hilar region, and when one develops, the other may develop.

Figure 4:
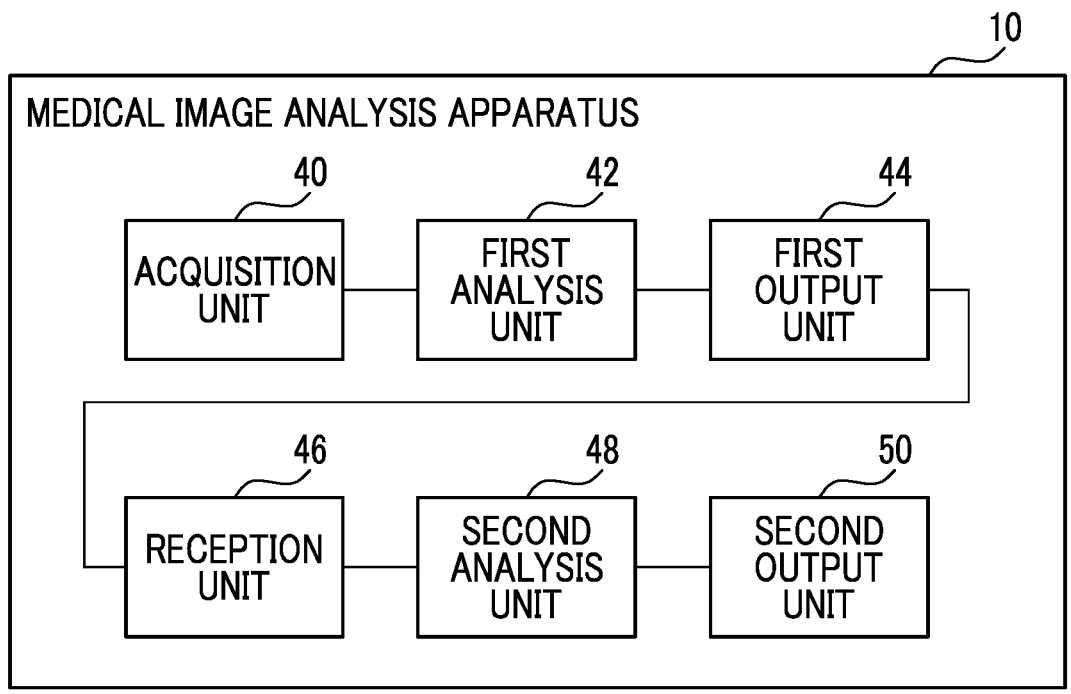
FIG. 4 is a block diagram showing an example of a functional configuration of a medical image analysis apparatus according to a first embodiment.

Next, a functional configuration of the medical image analysis apparatus 10 according to the present embodiment will be described with reference to FIG. 4. As shown in FIG. 4, the medical image analysis apparatus 10 includes an acquisition unit 40, a first analysis unit 42, a first output unit 44, a reception unit 46, a second analysis unit 48, and a second output unit 50. The CPU 20 executes the medical image analysis program 30 to function as the acquisition unit 40, the first analysis unit 42, the first output unit 44, the reception unit 46, the second analysis unit 48, and the second output unit 50.

The acquisition unit 40 acquires a medical image to be diagnosed (hereinafter referred to as a "diagnosis target image") from the image server 5 via the network OF 25. In the following, a case where the diagnosis target image is a chest CT image will be described as an example.

The first analysis unit 42 performs a first analysis process regarding a plurality of regions of interest included in the diagnosis target image acquired by the acquisition unit 40. Specifically, as the first analysis process, the first analysis unit 42 performs a process of detecting an abnormal shadow using a trained model M1 for detecting an abnormal shadow as an example of a region of interest from a diagnosis target image.

The trained model M1 is configured by, for example, a convolutional neural network (CNN) that receives a medical image as an input and outputs information about an abnormal shadow included in the medical image. The trained model M1 is, for example, a model trained by machine learning using, as training data, a large number of combinations of a medical image including an abnormal shadow, information specifying a region in the medical image in which the abnormal shadow is present, and a diagnosis name of the abnormal shadow.

Figure 5:
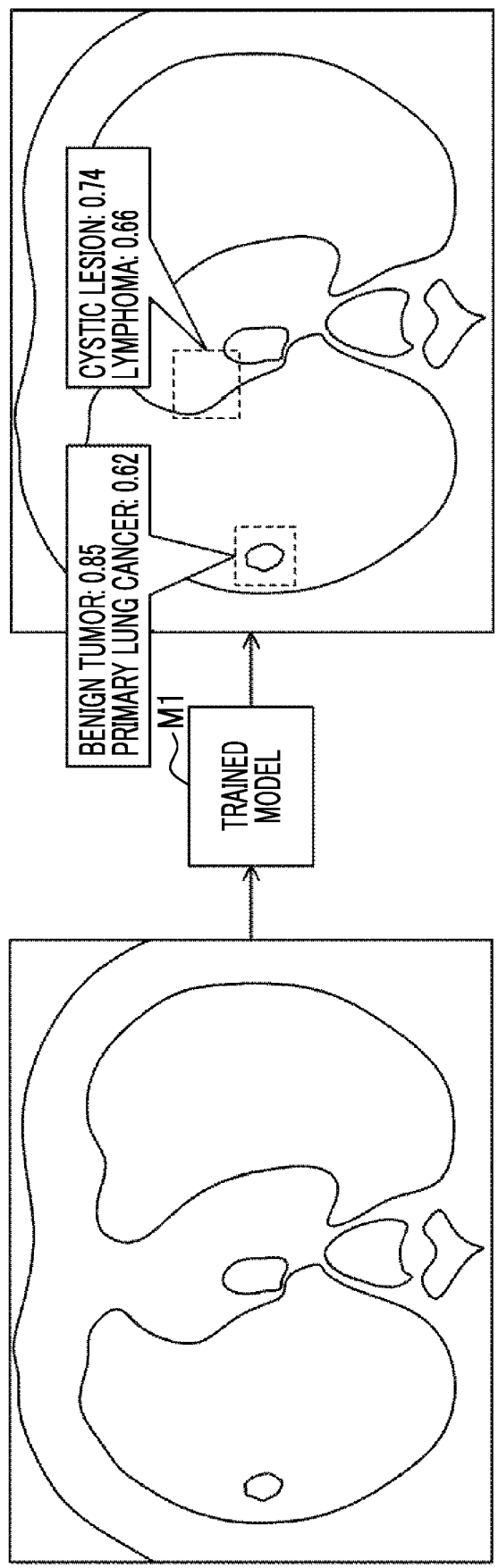
FIG. 5 is a diagram for describing a first analysis process using a trained model according to first to third embodiments.

As shown in FIG. 5 as an example, the first analysis unit 42 inputs the diagnosis target image to the trained model M1. The trained model M1 outputs information indicating a region in which an abnormal shadow included in the input diagnosis target image is present, a diagnosis name of the abnormal shadow, and a degree of certainty of the diagnosis name. At this time, the trained model M1 outputs information indicating a region in which an abnormal shadow in which the degree of certainty of the diagnosis name is equal to or greater than a predetermined threshold value TH1 (for example, 0.5) is present. In the example of FIG. 5, a broken-line rectangle indicates the region where the abnormal shadow is present, and the diagnosis name and the degree of certainty are indicated in the balloon. The first analysis unit 42 obtains, as the analysis result of the first analysis process, information indicating a region in which an abnormal shadow included in the input diagnosis target image is present, a diagnosis name of the abnormal shadow, and a degree of certainty of the diagnosis name.

Figure 6:
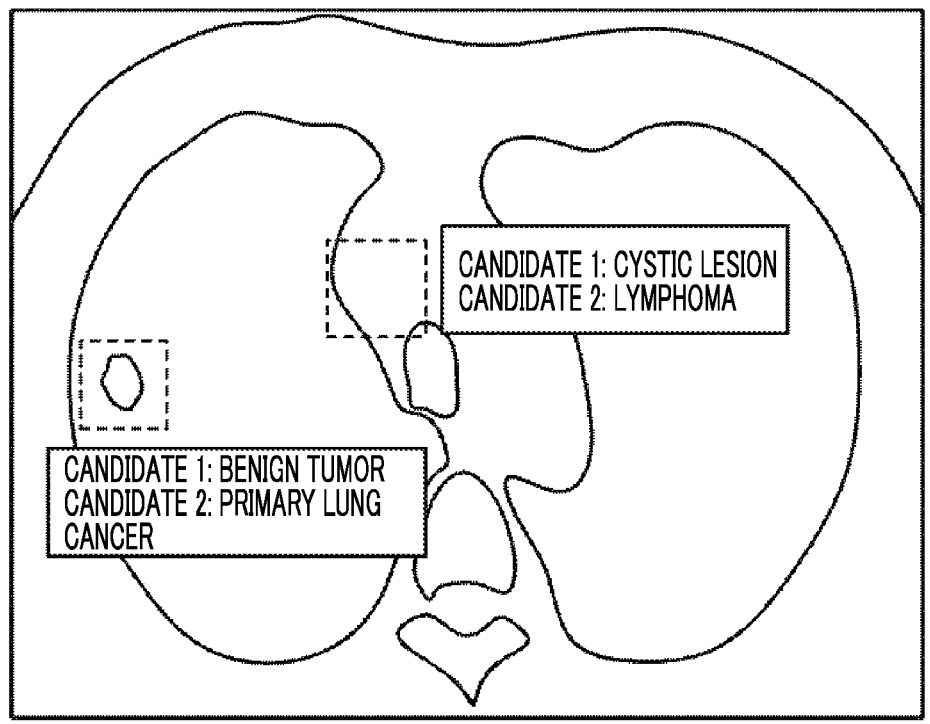
FIG. 6 is a diagram showing an example of a first analysis result display screen according to the first and second embodiments.

The first output unit 44 performs control to display an analysis result from the first analysis unit 42 on the display 23 by outputting the analysis result to the display 23. At this time, the first output unit 44 performs control to display the diagnosis names of the abnormal shadow on the display 23 in descending order of a degree of certainty. FIG. 6 shows an example of a first analysis result display screen displayed on the display 23 under the control of the first output unit 44. As shown in FIG. 6, on the first analysis result display screen, information indicating a region in which an abnormal shadow is present and a diagnosis name of the abnormal shadow are displayed. In the example of FIG. 6, a region where an abnormal shadow is present is indicated by a broken-line rectangle. In addition, FIG. 6 shows an example in which the degree of certainty of a benign tumor is higher than the degree of certainty of a primary lung cancer and the degree of certainty of a cystic lesion is higher than the degree of certainty of a lymphoma.

A user such as a doctor selects one diagnosis name form among a plurality of diagnosis names which are a plurality of analysis results of a first analysis process regarding a first abnormal shadow among a plurality of abnormal shadows displayed on the first analysis result display screen. The reception unit 46 receives, as an input for the first abnormal shadow among the plurality of abnormal shadows, one diagnosis name selected by the user from among the plurality of diagnosis names which are the plurality of analysis results of the first analysis process regarding the first abnormal shadow.

The second analysis unit 48 performs a second analysis process regarding a second abnormal shadow related to the first abnormal shadow. Specifically, first, the second analysis unit 48 refers to the relevant diagnosis name table 32 and acquires the diagnosis name related to the one diagnosis name received by the reception unit 46. Then, the second analysis unit 48 performs a second analysis process regarding the second abnormal shadow whose acquired diagnosis name is obtained as the analysis result of the first analysis unit 42. In the present embodiment, as the second analysis process, the second analysis unit 48 performs a process of correcting the degree of certainty of a diagnosis name that matches the acquired diagnosis name among the plurality of diagnosis names obtained by the first analysis process regarding the second abnormal shadow. At this time, the second analysis unit 48 corrects the degree of certainty to be higher by a predetermined percentage (for example, 20%).

Figure 7:
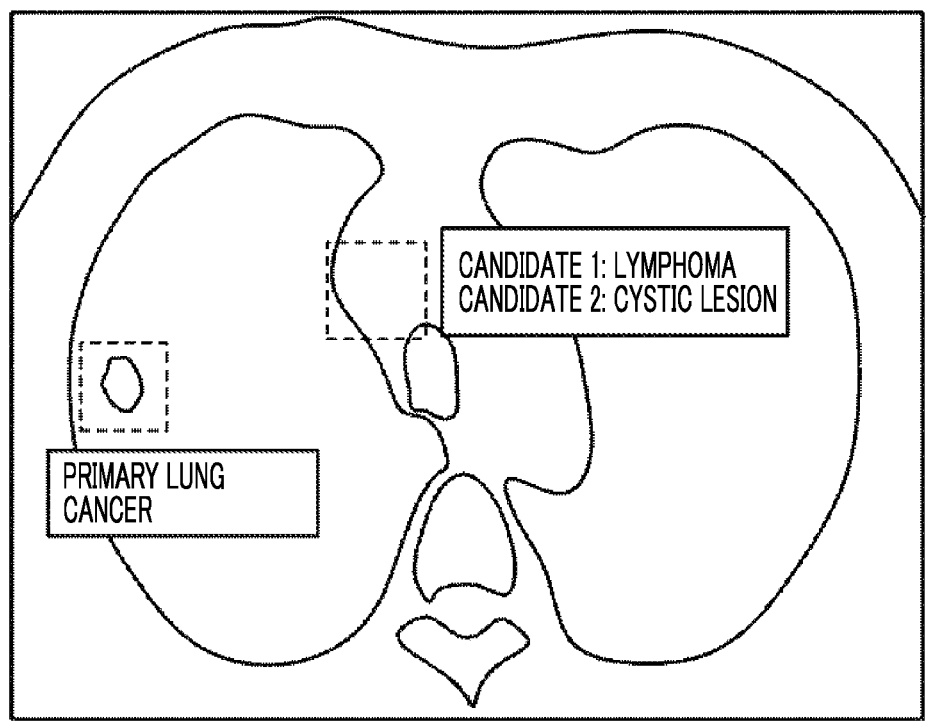
FIG. 7 is a diagram showing an example of a second analysis result display screen according to the first and second embodiments.

The second output unit 50 performs control to display an analysis result of the second abnormal shadow from the second analysis unit 48 on the display 23 by outputting the analysis result of the second abnormal shadow to the display 23. At this time, the second output unit 50 performs control to display the diagnosis names of the second abnormal shadow on the display 23 in descending order of a degree of certainty. FIG. 7 shows an example of a second analysis result display screen displayed on the display 23 under the control of the second output unit 50. FIG. 7 shows an example in which the user selects the primary lung cancer from among a plurality of diagnosis names of the first abnormal shadow on the left side in the example of FIG. 6. In addition, FIG. 7 shows an example in which the second analysis unit 48 corrects the degree of certainty of the lymphoma of the second abnormal shadow on the right side related to primary lung cancer to be higher than the degree of certainty of the cystic lesion. In this manner, the display order of the diagnosis names of the second abnormal shadow is changed according to the user's selection of the diagnosis name of the first abnormal shadow. The user refers to the second analysis result display screen to create a medical document such as an interpretation report.

Figure 25:
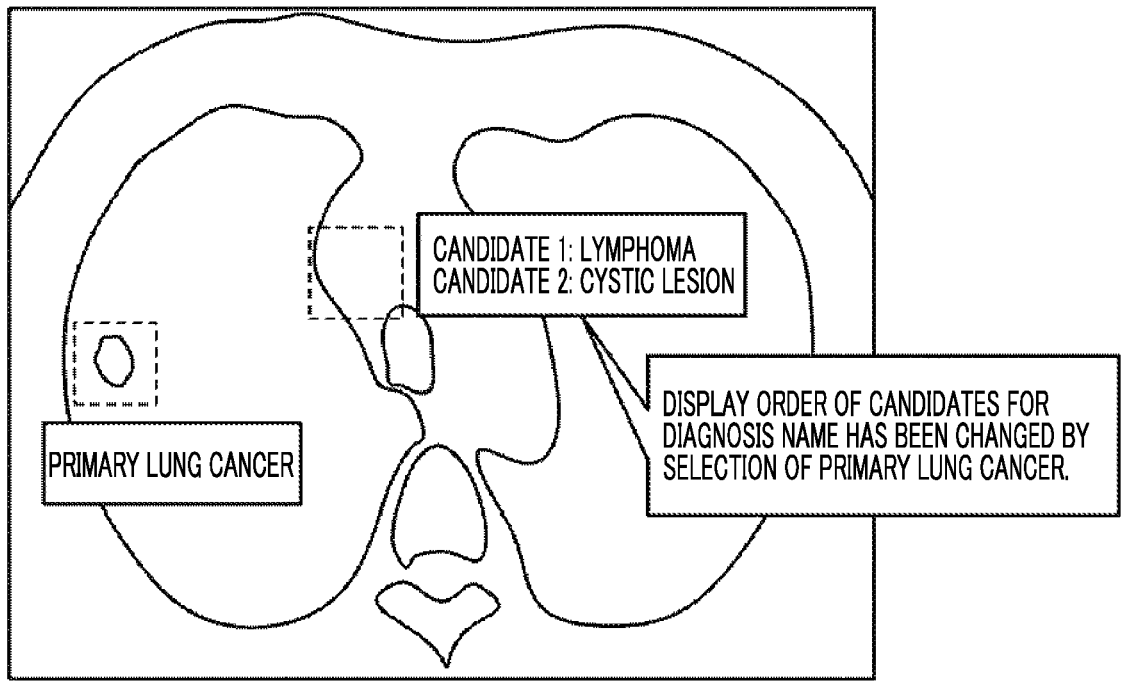
FIG. 25 is a diagram showing an example of a second analysis result display screen according to a modification example.

In a case where the result of the second analysis process regarding the second abnormal shadow is different from the result of the first analysis process, the second output unit 50 may provide a notification that the result of the second analysis process is different from the result of the first analysis process. Specifically, in this case, as shown in FIG. 25 as an example, the second output unit 50 performs control to display, on the display 23, that the result of the second analysis process for the second abnormal shadow has been changed from the result of the first analysis process by the user's selection of one diagnosis name of the first abnormal shadow. FIG. 25 shows an example of a notification that the display order of the candidates for the diagnosis name of the second abnormal shadow has been changed by the user's selection of primary lung cancer as the diagnosis name of the first abnormal shadow. Also, the notification function may be switchable between on and off by the user.

Figure 8:
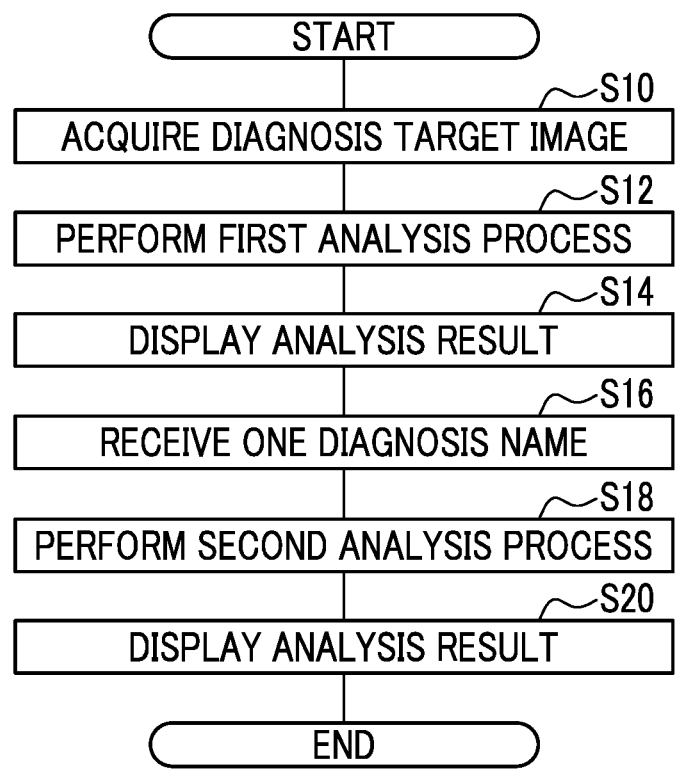
FIG. 8 is a flowchart showing an example of a medical image analysis process according to the first embodiment.

Next, with reference to FIG. 8, operations of the medical image analysis apparatus 10 according to the present embodiment will be described. The CPU 20 executes the medical image analysis program 30, whereby a medical image analysis process shown in FIG. 8 is executed. The medical image analysis process shown in FIG. 8 is executed, for example, in a case where an instruction to start execution is input by the user.

In Step S10 of FIG. 8, the acquisition unit 40 acquires the diagnosis target image from the image server 5 via the network I/F 25. In Step S12, as described above, the first analysis unit 42 performs the first analysis process regarding a plurality of regions of interest included in the diagnosis target image acquired in Step S10. In Step S14, as described above, the first output unit 44 performs control to display the analysis result in Step S12 on the display 23 by outputting the analysis result to the display 23.

In Step S16, the reception unit 46 receives one diagnosis name selected by the user from among a plurality of diagnosis names of the first abnormal shadow among the plurality of abnormal shadows displayed in Step S14. In Step S18, as described above, the second analysis unit 48 refers to the relevant diagnosis name table 32 and acquires the diagnosis name related to the one diagnosis name received in Step S16. Then, as described above, the second analysis unit 48 performs the second analysis process regarding the second abnormal shadow whose acquired diagnosis name is obtained as the analysis result in Step S12.

In Step S20, as described above, the second output unit 50 performs control to display the analysis result of the second abnormal shadow in Step S18 on the display 23 by outputting the analysis result to the display 23. In a case where the process of Step S20 ends, the medical image analysis process ends.

As described above, according to the present embodiment, it is possible to improve the accuracy of analysis results of a region of interest.

Figures 9, 10:
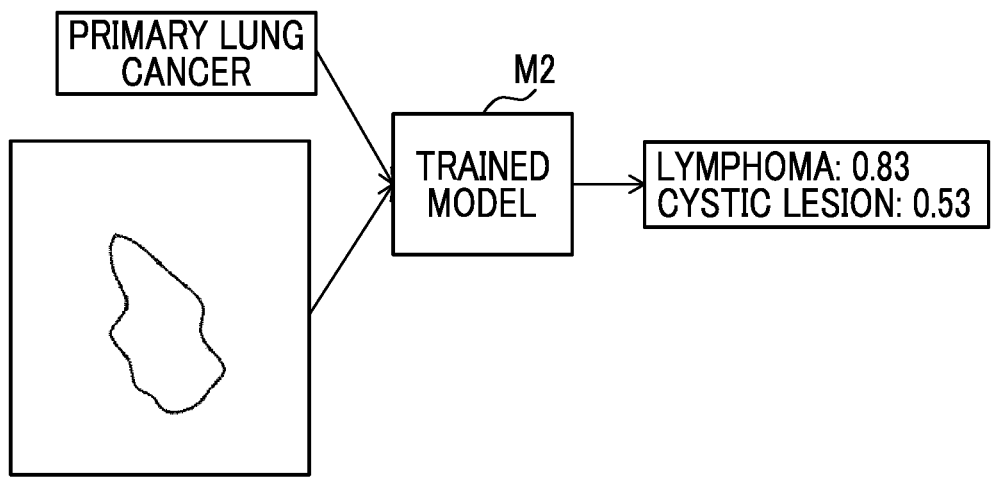
FIG. 9 is a diagram for describing a second analysis process using a trained model.
FIG. 10 is a diagram showing an example of a relevant diagnosis name table according to a modification example.

In addition, as the second analysis process, the second analysis unit 48 may perform an analysis process regarding the second abnormal shadow based on a partial image including the second abnormal shadow of the diagnosis target image, one diagnosis name received by the reception unit 46, and a trained model M2 trained in advance using training data including a partial image for learning and a diagnosis name of an abnormal shadow included in the partial image for learning. In this case, as shown in FIG. 9 as an example, the second analysis unit 48 inputs, to the trained model M1, the partial image including one diagnosis name received by the reception unit 46 and the second abnormal shadow of the diagnosis target image. The trained model M2 outputs the diagnosis name and the degree of certainty of the diagnosis name of the second abnormal shadow included in the input partial image. The second analysis unit 48 obtains the diagnosis name and the degree of certainty of the diagnosis name of the second abnormal shadow as the analysis result of the second analysis process.

In addition, in a case where a plurality of diagnosis names related to one diagnosis name received by the reception unit 46 are present in the relevant diagnosis name table 32, the second analysis unit 48 may select one diagnosis name from among the plurality of diagnosis names related to one diagnosis name based on a co-occurrence probability of one diagnosis name and each of the plurality of diagnosis names related to one diagnosis name. In this case, for example, the second analysis unit 48 selects the diagnosis name having the highest co-occurrence probability from among the plurality of diagnosis names related to one diagnosis name. In addition, in this form example, the co-occurrence probability may be stored in the relevant diagnosis name table 32.

Figure 11:
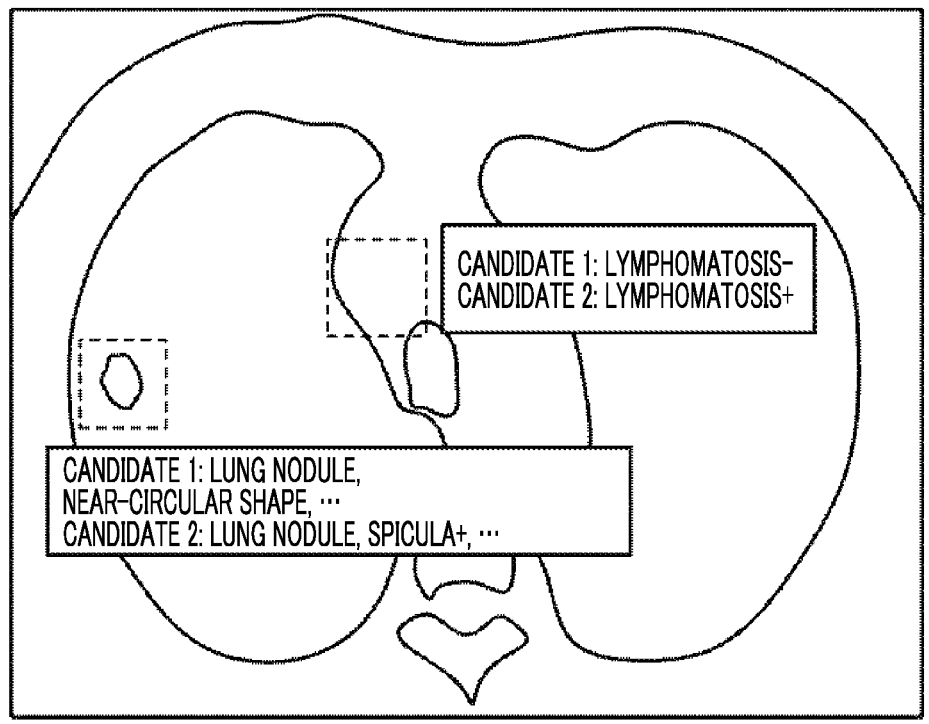
FIG. 11 is a diagram showing an example of a first analysis result display screen according to a modification example.
Figure 12:
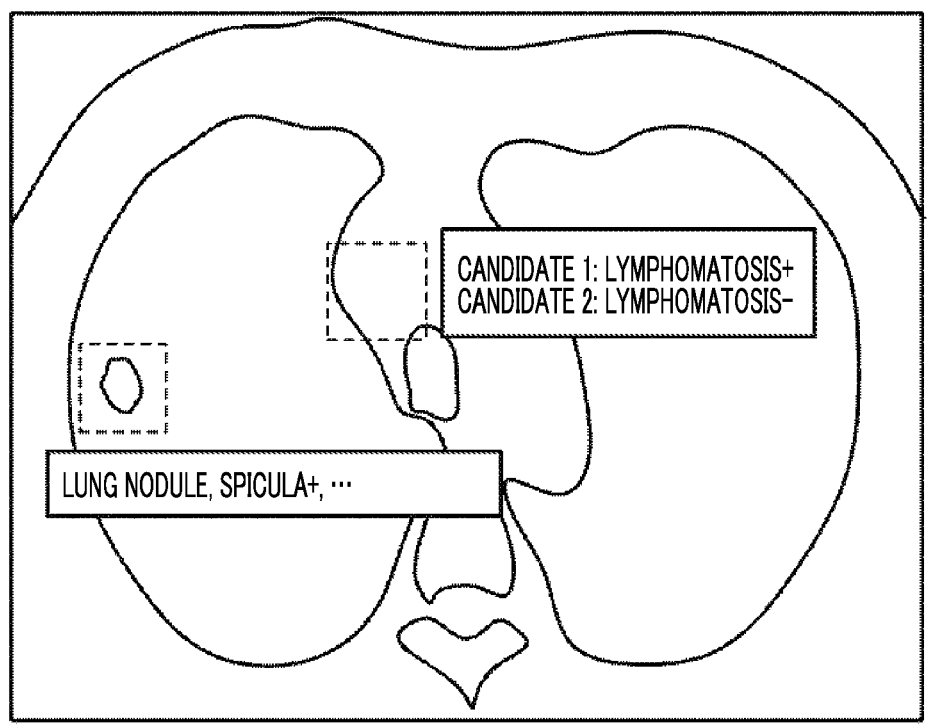
FIG. 12 is a diagram showing an example of a second analysis result display screen according to a modification example.

Further, the diagnosis name may be associated not only with the diagnosis name but also with a combination of the diagnosis name and the findings. FIG. 10 shows an example of the relevant diagnosis name table 32 in this case. In this case, as shown in FIG. 11 as an example, the diagnosis name and the findings are displayed on the first analysis result display screen. In this case, as shown in FIG. 12 as an example, on the second analysis result display screen, after the degree of certainty of the diagnosis name corresponding to the combination of the diagnosis name and the finding selected by the user is corrected, the diagnosis name is displayed according to the degree of certainty.

In addition, the second analysis unit 48 may determine the second abnormal shadow related to each of the plurality of abnormal shadows before the reception unit 46 receives the user's input regarding the first abnormal shadow. In this case, the second analysis unit 48 selects a second abnormal shadow related to the first abnormal shadow from among the second abnormal shadows determined for each of the plurality of abnormal shadows based on the input received by the reception unit 46. Then, the second analysis unit 48 performs the second analysis process regarding the selected second abnormal shadow.

Specifically, the second analysis unit 48 refers to the relevant diagnosis name table 32 and acquires a diagnosis name related to the diagnosis name obtained as the analysis result from the first analysis unit 42 for each of the plurality of abnormal shadows. Further, the second analysis unit 48 determines abnormal shadows whose diagnosis name acquired for each of the plurality of abnormal shadows is included in the analysis result of the first analysis unit 42 as related second abnormal shadows. Next, in a case where the diagnosis name of the first abnormal shadow is selected by the user on the first analysis result display screen, the second analysis unit 48 selects a second abnormal shadow for which the selected diagnosis name is included in the analysis result obtained from the first analysis unit 42 from among the second abnormal shadows determined for each of the plurality of abnormal shadows. Then, the second analysis unit 48 performs the second analysis process regarding the selected second abnormal shadow.

Figure 26:
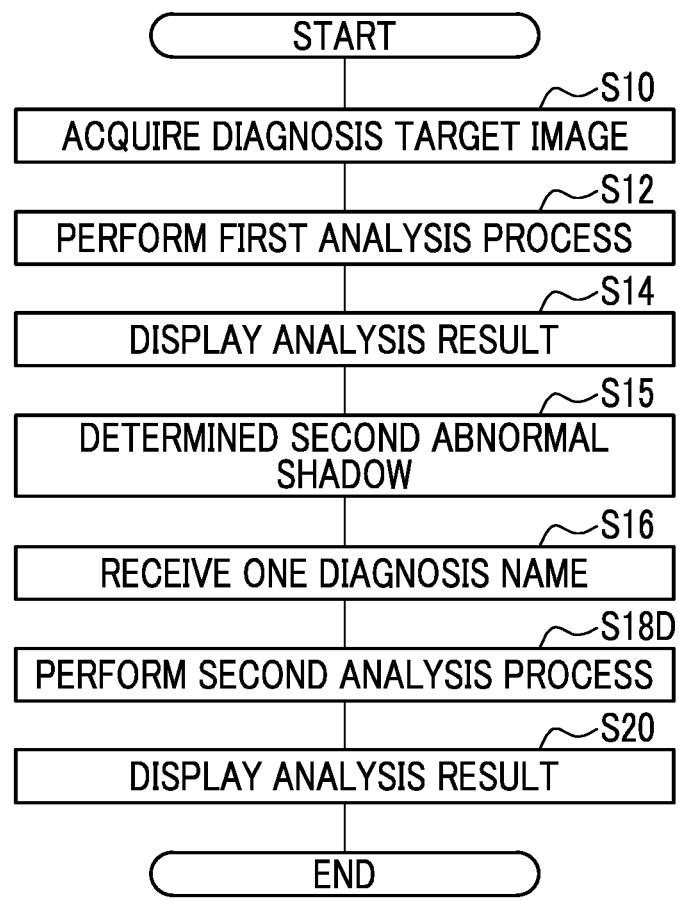
FIG. 26 is a flowchart illustrating an example of a medical image analysis process according to a modification example.

FIG. 26 shows an example of the flow of the medical image analysis process in this form example. Steps in FIG. 26 that execute the same processing as in FIG. 8 are given the same step numbers and descriptions thereof will be omitted.

In Step S15 of FIG. 26, the second analysis unit 48 refers to the relevant diagnosis name table 32 and acquires a diagnosis name related to the diagnosis name obtained as the analysis result from the first analysis unit 42 for each of the plurality of abnormal shadows. Further, the second analysis unit 48 determines abnormal shadows whose diagnosis name acquired for each of the plurality of abnormal shadows is included in the analysis result of the first analysis unit 42 as related second abnormal shadows. Note that the process of Step S15 may be executed after Step S12 and before Step S14. In addition, the process of Step S15 may be executed in parallel with the process of Step S14.

In Step S18D, the second analysis unit 48 selects, from among the second abnormal shadows determined in Step S15 for each of the plurality of abnormal shadows, a second abnormal shadow for which one diagnosis name received in Step S16 is included in the analysis result obtained in Step S12. Then, the second analysis unit 48 performs the second analysis process regarding the selected second abnormal shadow.

Second Embodiment

A second embodiment of the disclosed technology will be described. Since the configuration of the medical information system 1 and the hardware configuration of the medical image analysis apparatus 10 according to the present embodiment are the same as those of the first embodiment, the description thereof will be omitted.

Figure 13:
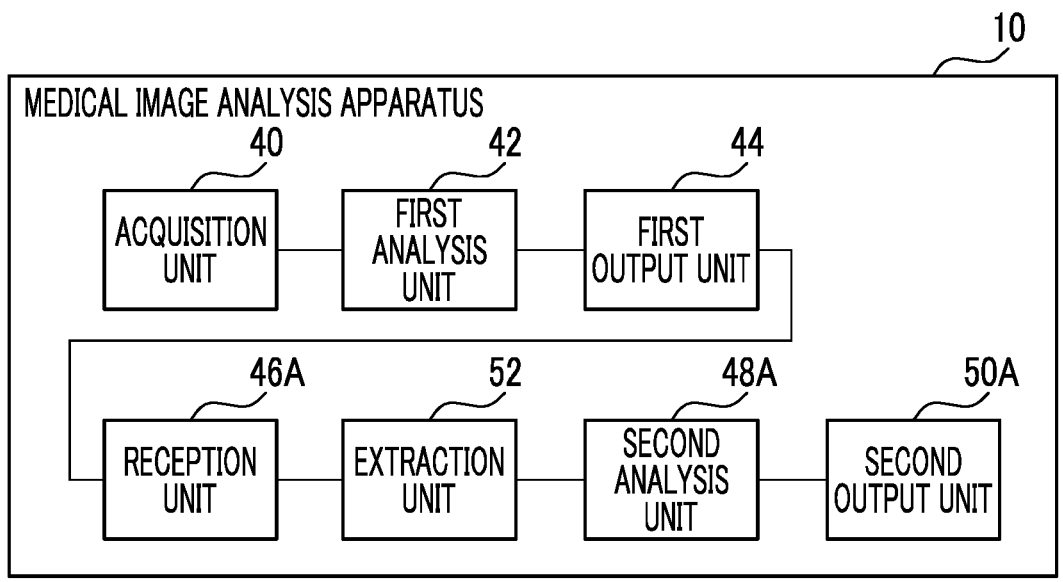
FIG. 13 is a block diagram showing an example of a functional configuration of a medical image analysis apparatus according to the second embodiment.

A functional configuration of the medical image analysis apparatus 10 according to the present embodiment will be described with reference to FIG. 13. The same reference numerals are assigned to the functional units having the same functions as the medical image analysis apparatus 10 according to the first embodiment, and the description thereof will be omitted. As shown in FIG. 13, the medical image analysis apparatus 10 includes an acquisition unit 40, a first analysis unit 42, a first output unit 44, a reception unit 46A, a second analysis unit 48A, a second output unit 50A, and an extraction unit 52. The CPU 20 executes the medical image analysis program 30 to function as the acquisition unit 40, the first analysis unit 42, the first output unit 44, the reception unit 46A, the second analysis unit 48A, the second output unit 50A, and the extraction unit 52.

Figure 14:
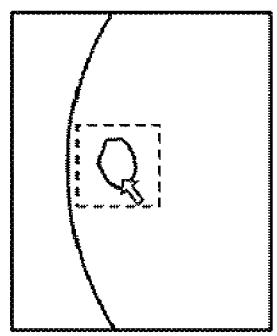
FIG. 14 is a diagram for describing an input of comments on findings by a user.

In the present embodiment, on the first analysis result display screen shown in FIG. 6, as shown in FIG. 14 as an example, the user designates a first abnormal shadow from among a plurality of abnormal shadows, and inputs comments on findings regarding the designated first abnormal shadow. The reception unit 46A receives the comments on findings regarding the first abnormal shadow input by the user as the input for the first abnormal shadow.

The extraction unit 52 extracts the diagnosis name of the first abnormal shadow from the comments on findings received by the reception unit 46A. For this extraction, for example, a known technique such as natural language processing using a recurrent neural network or matching processing with a word dictionary of diagnosis names prepared in advance can be used.

The second analysis unit 48A selects a diagnosis name that matches the diagnosis name extracted by the extraction unit 52 from among a plurality of diagnosis names that are a plurality of analysis results of the first analysis process by the first analysis unit 42 regarding the first abnormal shadow. The second analysis unit 48A refers to the relevant diagnosis name table 32 and acquires the diagnosis name related to the one selected diagnosis name. Then, the second analysis unit 48A performs a second analysis process regarding the second abnormal shadow whose acquired diagnosis name is obtained as the analysis result of the first analysis unit 42. Since the second analysis process is the same process as that of the first embodiment, the description thereof will be omitted.

Similarly to the second output unit 50 according to the first embodiment, the second output unit 50A performs control to display an analysis result of the second abnormal shadow from the second analysis unit 48A on the display 23 by outputting the analysis result of the second abnormal shadow to the display 23. That is, in the present embodiment, in the example of FIG. 6, when the user inputs the comments on findings shown in FIG. 14 for the first abnormal shadow on the left side, as shown in FIG. 7, the display order of the diagnosis names of the second abnormal shadow is changed based on the comments on findings.

Figure 15:
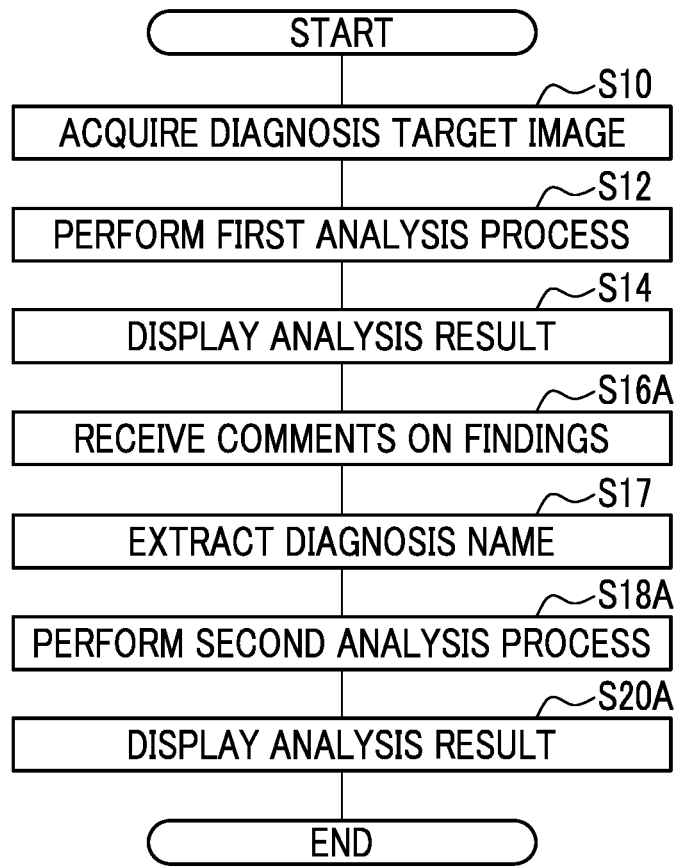
FIG. 15 is a flowchart showing an example of a medical image analysis process according to the second embodiment.

Next, with reference to FIG. 15, operations of the medical image analysis apparatus 10 according to the present embodiment will be described. The CPU 20 executes the medical image analysis program 30, whereby a medical image analysis process shown in FIG. 15 is executed. The medical image analysis process shown in FIG. 15 is executed, for example, in a case where an instruction to start execution is input by the user. Steps in FIG. 15 that execute the same processing as in FIG. 8 are given the same step numbers and descriptions thereof will be omitted.

In Step S16A of FIG. 15, the reception unit 46A receives the comments on findings input by the user for the first abnormal shadow among the plurality of abnormal shadows displayed in Step S14. In Step S17, the extraction unit 52 extracts the diagnosis name of the first abnormal shadow from the comments on findings received in Step S16A.

In Step S18A, the second analysis unit 48A selects a diagnosis name that matches the diagnosis name extracted in Step S17 from among a plurality of diagnosis names that are a plurality of analysis results of the first analysis process in Step S12 regarding the first abnormal shadow. The second analysis unit 48A refers to the relevant diagnosis name table 32 and acquires the diagnosis name related to the one selected diagnosis name. Then, the second analysis unit 48A performs a second analysis process regarding the second abnormal shadow whose acquired diagnosis name is obtained as the analysis result in Step S12.

In Step S20A, the second output unit 50A performs control to display the analysis result of the second abnormal shadow in Step S18A on the display 23 by outputting the analysis result to the display 23. In a case where the process of Step S20A ends, the medical image analysis process ends.

As described above, according to the present embodiment, the same effect as the first embodiment can be obtained.

Third Embodiment

A third embodiment of the disclosed technology will be described. Since the configuration of the medical information system 1 and the hardware configuration of the medical image analysis apparatus 10 according to the present embodiment are the same as those of the first embodiment, the description thereof will be omitted.

Figure 16:
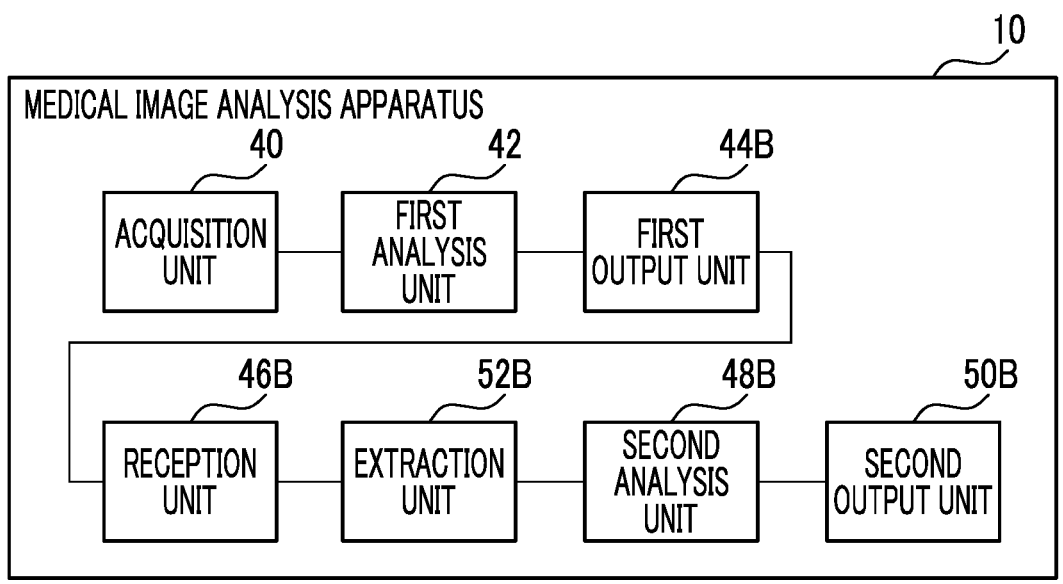
FIG. 16 is a block diagram showing an example of a functional configuration of a medical image analysis apparatus according to the third embodiment.

A functional configuration of the medical image analysis apparatus 10 according to the present embodiment will be described with reference to FIG. 16. The same reference numerals are assigned to the functional units having the same functions as the medical image analysis apparatus 10 according to the first embodiment, and the description thereof will be omitted. As shown in FIG. 16, the medical image analysis apparatus 10 includes an acquisition unit 40, a first analysis unit 42, a first output unit 44B, a reception unit 46B, a second analysis unit 48B, a second output unit 50B, and an extraction unit 52B. The CPU 20 executes the medical image analysis program 30 to function as the acquisition unit 40, the first analysis unit 42, the first output unit 44B, the reception unit 46B, the second analysis unit 48B, the second output unit 50B, and the extraction unit 52B.

Figure 17:
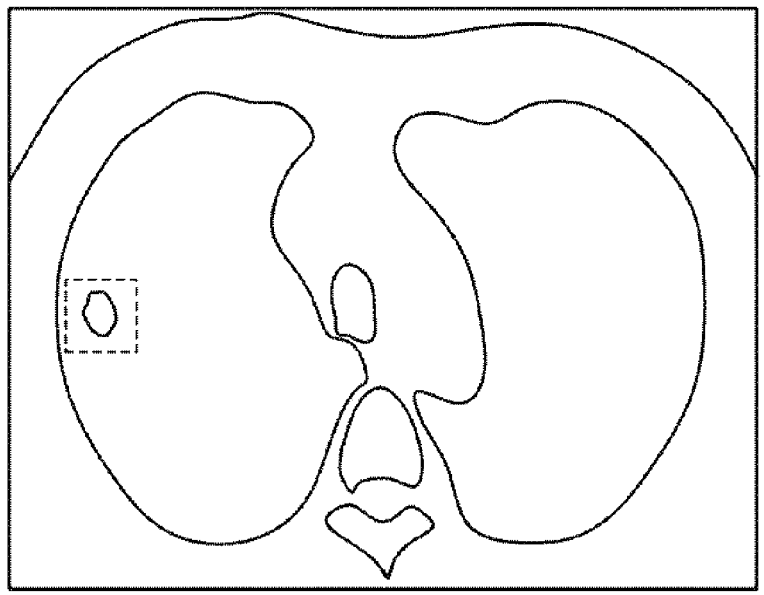
FIG. 17 is a diagram showing an example of a first analysis result display screen according to the third embodiment.

The first output unit 44B performs control to display an analysis result from the first analysis unit 42 on the display 23 by outputting the analysis result to the display 23. At this time, in the present embodiment, the first output unit 44B performs control to display the information indicating the abnormal shadow on the display 23. FIG. 17 shows an example of a first analysis result display screen displayed on the display 23 under the control of the first output unit 44B. As shown in FIG. 17, on the first analysis result display screen according to the present embodiment, the diagnosis name of the abnormal shadow is not displayed on the display 23. Note that the first output unit 44B may perform control to display the diagnosis name of the abnormal shadow on the display 23 similarly to the first output unit 44.

The user designates the first abnormal shadow on the first analysis result display screen shown in FIG. 17, and inputs a comment on findings regarding the designated first abnormal shadow. Similarly to the reception unit 46A according to the second embodiment, the reception unit 46B receives the comment on findings regarding the first abnormal shadow input by the user as the input for the first abnormal shadow.

Similarly to the extraction unit 52 according to the second embodiment, the extraction unit 52B extracts the diagnosis name of the first abnormal shadow from the comment on findings received by the reception unit 46B.

As the second analysis process, the second analysis unit 48B performs the first analysis process by changing analysis parameters for the diagnosis name related to the diagnosis name extracted by the extraction unit 52B. Specifically, the second analysis unit 48B refers to the relevant diagnosis name table 32 and acquires the diagnosis name related to the diagnosis name extracted by the extraction unit 52B. Then, the second analysis unit 48B performs the first analysis process by changing the analysis parameters for the acquired diagnosis name. In the present embodiment, the second analysis unit 48B performs the first analysis process by changing the threshold value TH1, which is used as an analysis parameter for comparison with the degree of certainty of the acquired diagnosis name, to a value smaller than that in the analysis by the first analysis unit 42.

That is, the second analysis unit 48B changes the threshold value TH1 used for comparison with the degree of certainty of the acquired diagnosis name to a value smaller than that in the analysis process by the first analysis unit 42, and then input the diagnosis target image to the trained model M1. The trained model M1 outputs information indicating a region in which an abnormal shadow included in the input diagnosis target image is present, a diagnosis name of the abnormal shadow, and a degree of certainty of the diagnosis name. At this time, the trained model M1 outputs information indicating a region in which an abnormal shadow in which the degree of certainty of the diagnosis name is equal to or greater than the threshold value TH1 is present. Therefore, as compared with the analysis process by the first analysis unit 42, the detection sensitivity of the diagnosis name related to the diagnosis name extracted by the extraction unit 52B is increased.

In addition, for example, in a case where the second analysis unit 48B desires to reduce the detection sensitivity of a diagnosis name having a low co-occurrence probability, the threshold value TH1 may be changed to a value larger than that in the analysis process by the first analysis unit 42.

Figure 18:
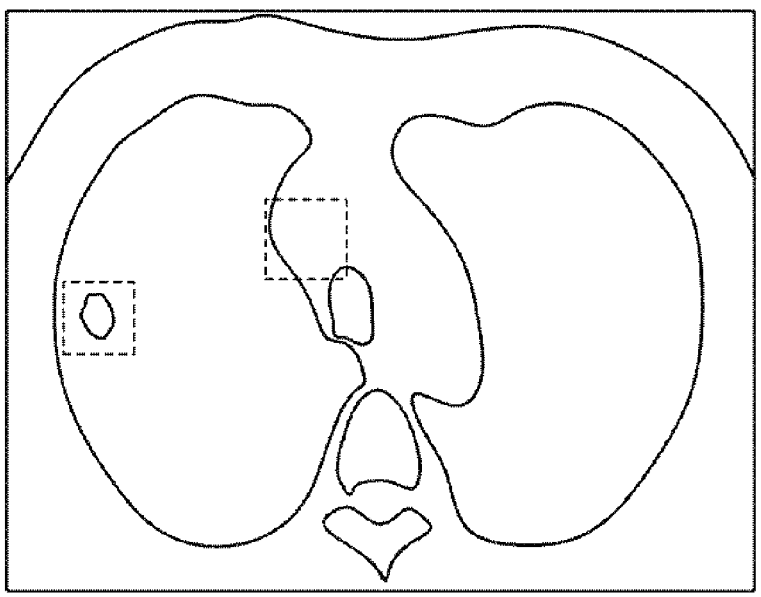
FIG. 18 is a diagram showing an example of a second analysis result display screen according to the third embodiment.

Similarly to the first output unit 44B, the second output unit 50B performs control to display an analysis result from the second analysis unit 48B on the display 23 by outputting the analysis result to the display 23. FIG. 18 shows an example of a second analysis result display screen displayed on the display 23 under the control of the second output unit 50B. FIG. 18 shows an example in which an abnormal shadow surrounded by a broken-line rectangle on the right side, which was not detected in the example of FIG. 17, was newly detected by the analysis process by the second analysis unit 48B.

Figures 19, 20:
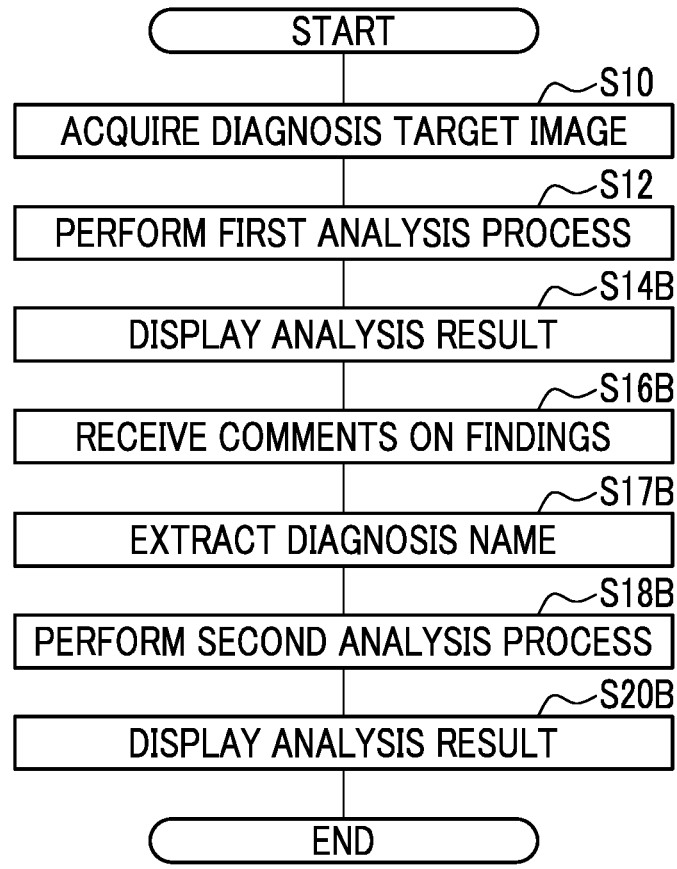
FIG. 19 is a flowchart showing an example of a medical image analysis process according to the third embodiment.
FIG. 20 is a diagram showing an example of a relevant findings table.

Next, with reference to FIG. 19, operations of the medical image analysis apparatus 10 according to the present embodiment will be described. The CPU 20 executes the medical image analysis program 30, whereby a medical image analysis process shown in FIG. 19 is executed. The medical image analysis process shown in FIG. 19 is executed, for example, in a case where an instruction to start execution is input by the user. Steps in FIG. 19 that execute the same processing as in FIG. 8 are given the same step numbers and descriptions thereof will be omitted.

In Step S14B of FIG. 19, the first output unit 44B performs control to display the analysis result in Step S12 on the display 23 by outputting the analysis result to the display 23. At this time, the first output unit 44B performs control to display the information indicating the abnormal shadow on the display 23. In Step S16B, the reception unit 46B receives the comments on findings input by the user for the first abnormal shadow displayed in Step S14B. In Step S17B, the extraction unit 52B extracts the diagnosis name of the first abnormal shadow from the comments on findings received in Step S16B.

In Step S18B, as described above, as the second analysis process, the second analysis unit 48B performs the first analysis process by changing analysis parameters for the diagnosis name related to the diagnosis name extracted in Step S17B. In Step S20B, the second output unit 50B performs control to display the analysis result in Step S18B on the display 23 by outputting the analysis result to the display 23. In a case where the process of Step S20B ends, the medical image analysis process ends.

As described above, according to the present embodiment, the same effect as the first embodiment can be obtained.

Fourth Embodiment

A fourth embodiment of the disclosed technology will be described. Since the configuration of the medical information system 1 and the hardware configuration of the medical image analysis apparatus 10 according to the present embodiment are the same as those of the first embodiment, the description thereof will be omitted.

In the present embodiment, a relevant findings table 34 is stored in the storage unit 22 instead of the relevant diagnosis name table 32. FIG. 20 shows an example of the relevant findings table 34. As shown in FIG. 20, in the relevant findings table 34, the findings and the findings related to the findings are associated with each other. For example, a lobulation+ is associated with the spicula+. This is because spicula+ and lobulation+ have a relatively high co-occurrence probability.

Figure 21:
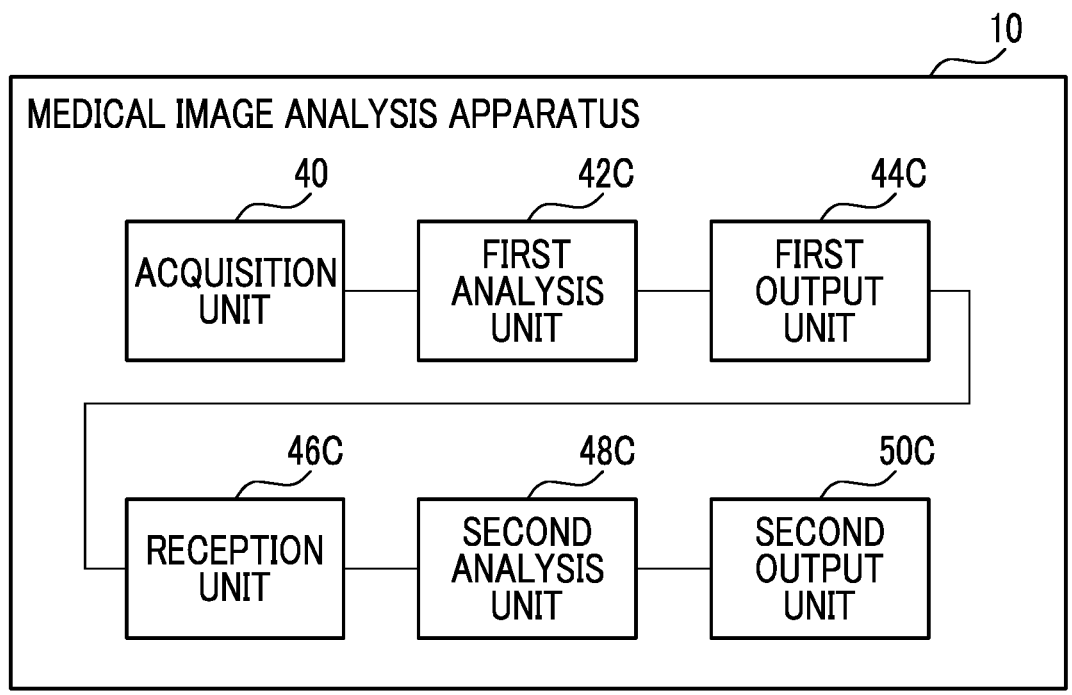
FIG. 21 is a block diagram showing an example of a functional configuration of a medical image analysis apparatus according to a fourth embodiment.

A functional configuration of the medical image analysis apparatus 10 according to the present embodiment will be described with reference to FIG. 21. The same reference numerals are assigned to the functional units having the same functions as the medical image analysis apparatus 10 according to the first embodiment, and the description thereof will be omitted. As shown in FIG. 21, the medical image analysis apparatus 10 includes an acquisition unit 40, a first analysis unit 42C, a first output unit 44C, a reception unit 46C, a second analysis unit 48C, and a second output unit 50C. The CPU 20 executes the medical image analysis program 30 to function as the acquisition unit 40, the first analysis unit 42C, the first output unit 44C, the reception unit 46C, the second analysis unit 48C, and the second output unit 50C.

The first analysis unit 42C performs an analysis process regarding a region of interest included in the diagnosis target image acquired by the acquisition unit 40. Specifically, first, the first analysis unit 42C detects an abnormal shadow as an example of a region of interest included in the diagnosis target image by using the trained model M1 similarly to the first analysis unit 42 according to the first embodiment.

Next, the first analysis unit 42C performs a process of deriving the findings by using a trained model M3 for deriving the findings from the image including the abnormal shadow as the analysis process. The trained model M3 is configured by, for example, a CNN that receives an image including an abnormal shadow as an input and outputs findings related to the abnormal shadow included in the image. The trained model M3 is, for example, a model trained by machine learning using a large number of combinations of an image including an abnormal shadow and findings of the abnormal shadow in the image as training data.

Figure 22:
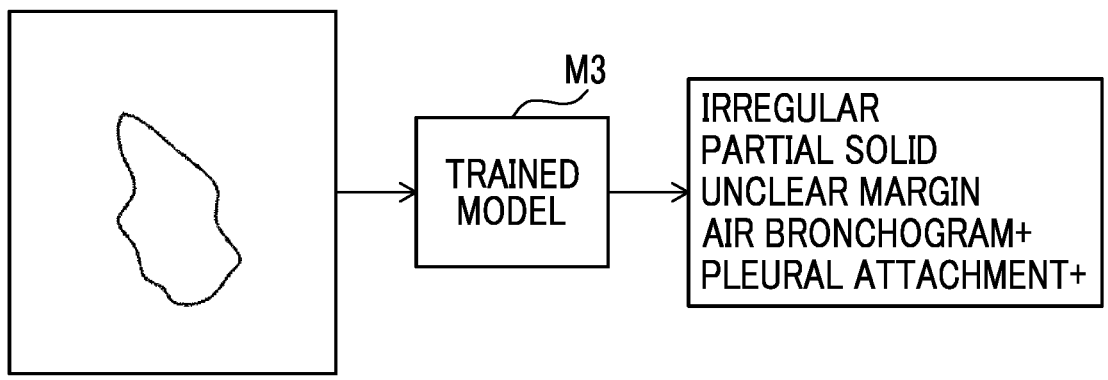
FIG. 22 is a diagram for describing an analysis process using a trained model according to the fourth embodiment.

As shown in FIG. 22 as an example, the first analysis unit 42C inputs a partial image of a region including the abnormal shadow in the diagnosis target image to the trained model M3. The trained model M3 outputs findings of the abnormal shadow included in the input partial image. At this time, the trained model M3 outputs findings having a degree of certainty of findings equal to or greater than a predetermined threshold value TH2 (for example, 0.5). FIG. 22 shows an example in which five findings are output from the trained model M3.

The first output unit 44C performs control to display the findings derived by the first analysis unit 42C on the display 23 as the analysis result from the first analysis unit 42C by outputting the findings to the display 23.

The user corrects the findings displayed on the display 23 as necessary. The reception unit 46C receives an input for correcting the findings by the user.

The second analysis unit 48C performs the analysis process by changing the analysis parameters for the findings related to the corrected findings based on the input received by the reception unit 46C. Specifically, the second analysis unit 48C refers to the relevant findings table 34 and acquires the findings related to the corrected findings. Then, the second analysis unit 48C performs the analysis process by changing the analysis parameters for the acquired findings. In the present embodiment, the second analysis unit 48C performs the analysis process by changing the threshold value TH2, which is used as an analysis parameter for comparison with the degree of certainty of the acquired finding, to a value smaller than that in the analysis by the first analysis unit 42C.

That is, the second analysis unit 48C changes the threshold value TH2 used for comparison with the degree of certainty of the acquired finding to a value smaller than that in the analysis process by the first analysis unit 42C, and then inputs a partial image of a region including the abnormal shadow in the diagnosis target image to the trained model M3. The trained model M3 outputs findings of the abnormal shadow included in the input partial image. At this time, the trained model M3 outputs information indicating a finding in which the degree of certainty of the finding is equal to or higher than the threshold value TH2. Therefore, as compared with the analysis process by the first analysis unit 42C, the detection sensitivity of the findings related to the corrected findings is increased.

Similarly to the first output unit 44C, the second output unit 50C performs control to display the findings derived by the second analysis unit 48C on the display 23 as the analysis result from the second analysis unit 48C by outputting the findings to the display 23.

Figure 23:
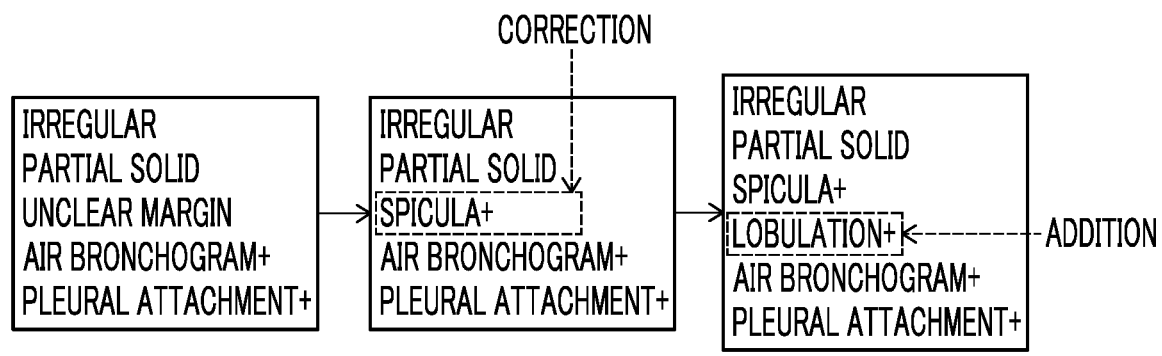
FIG. 23 is a diagram for describing that findings are corrected.

As shown in FIG. 23 as an example, it is assumed that five findings are derived by the first analysis unit 42C. Next, it is assumed that one of the five findings has been corrected by the user. FIG. 23 shows an example in which "unclear margin" is corrected to "spicula+". In this case, the second analysis unit 48C performs a finding derivation process by increasing the detection sensitivity of the "lobulation+" finding related to the corrected finding "spicula+". FIG. 23 shows an example in which the "lobulation+" that was not derived in the analysis process by the first analysis unit 42C was derived in the analysis process by the second analysis unit 48C.

Figure 24:
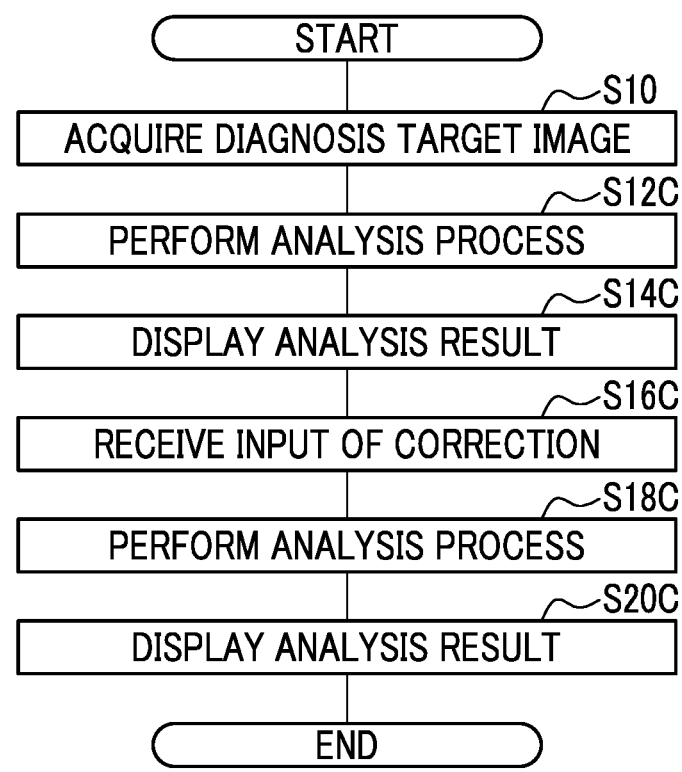
FIG. 24 is a flowchart showing an example of a medical image analysis process according to the fourth embodiment.

Next, with reference to FIG. 24, operations of the medical image analysis apparatus 10 according to the present embodiment will be described. The CPU 20 executes the medical image analysis program 30, whereby a medical image analysis process shown in FIG. 24 is executed. The medical image analysis process shown in FIG. 24 is executed, for example, in a case where an instruction to start execution is input by the user. Steps in FIG. 24 that execute the same processing as in FIG. 8 are given the same step numbers and descriptions thereof will be omitted.

In Step S12C of FIG. 24, as described above, the first analysis unit 42C detects an abnormal shadow included in the diagnosis target image acquired in Step S10 by using the trained model M1. Then, as described above, the first analysis unit 42C performs a process of deriving the findings by using the trained model M3 for deriving the findings from the image including the detected abnormal shadow as the analysis process.

In Step S14C, the first output unit 44C performs control to display the findings derived in Step S12C on the display 23 as the analysis result in Step S12C by outputting the findings to the display 23. In Step S16C, the reception unit 46C receives an input of the correction by the user for the findings displayed in Step S14C.

In Step S18C, as described above, the second analysis unit 48C performs the analysis process by changing the analysis parameters for the findings related to the corrected findings based on the input received in Step S16C. In Step S20C, the second output unit 50C performs control to display the findings derived in Step S18C on the display 23 as the analysis result in Step S18C by outputting the findings to the display 23. In a case where the process of Step S20C ends, the medical image analysis process ends.

As described above, according to the present embodiment, the same effect as the first embodiment can be obtained.

In the first to third embodiments, the case where the diagnosis name of the abnormal shadow is obtained as the analysis result from the first analysis unit 42 has been described, but the present disclosure is not limited thereto. For example, the name of the abnormal shadow, the finding of the abnormal shadow, or the comment on findings of the abnormal shadow may be configured to be applied as the analysis result from the first analysis unit 42. Examples of findings in this case include the position, size, transmittance (for example, solid or frosted glass), the presence or absence of a spicula, the presence or absence of calcification, the presence or absence of an irregular margin, the presence or absence of pleural invagination, the presence or absence of chest wall contact, and the like in the abnormal shadow. In addition, examples of the comment on findings include a sentence obtained by inputting a plurality of findings to the recurrent neural network.

In addition, in each of the above-described embodiments, the case where the region of the abnormal shadow is applied as the region of interest has been described, but the present disclosure is not limited thereto. As the region of interest, a region of an organ may be applied, or a region of an anatomical structure may be applied.

Further, in each of the above-described embodiments, for example, as a hardware structure of a processing unit that executes various kinds of processing, such as each functional unit of the medical image analysis apparatus 10, the following various processors can be used. As described above, the various processors include a programmable logic device (PLD) as a processor of which the circuit configuration can be changed after manufacture, such as a field programmable gate array (FPGA), a dedicated electrical circuit as a processor having a dedicated circuit configuration for executing specific processing such as an application specific integrated circuit (ASIC), and the like, in addition to the CPU as a general-purpose processor that functions as various processing units by executing software (programs).

One processing unit may be configured by one of the various processors, or may be configured by a combination of the same or different kinds of two or more processors (for example, a combination of a plurality of FPGAs or a combination of the CPU and the FPGA). In addition, a plurality of processing units may be configured by one processor.

As an example in which a plurality of processing units are configured by one processor, first, there is a form in which one processor is configured by a combination of one or more CPUs and software as typified by a computer, such as a client or a server, and this processor functions as a plurality of processing units. Second, there is a form in which a processor for realizing the function of the entire system including a plurality of processing units via one integrated circuit (IC) chip as typified by a system on chip (SoC) or the like is used. In this way, various processing units are configured by one or more of the above-described various processors as hardware structures.

Furthermore, as the hardware structure of the various processors, more specifically, an electrical circuit (circuitry) in which circuit elements such as semiconductor elements are combined can be used.

In the above embodiment, the medical image analysis program 30 has been described as being stored (installed) in the storage unit 22 in advance; however, the present disclosure is not limited thereto. The medical image analysis program 30 may be provided in a form recorded in a recording medium such as a compact disc read only memory (CD-ROM), a digital versatile disc read only memory (DVD-ROM), and a universal serial bus (USB) memory. In addition, the medical image analysis program 30 may be configured to be downloaded from an external device via a network.

The disclosures of Japanese Patent Application No. 2021-064397 filed on Apr. 5, 2021 and Japanese Patent Application No. 2021-208524 filed on Dec. 22, 2021 are incorporated herein by reference in their entirety. In addition, all literatures, patent applications, and technical standards described herein are incorporated by reference to the same extent as if the individual literature, patent applications, and technical standards were specifically and individually stated to be incorporated by reference.

What is claimed is:

1. A medical image analysis apparatus comprising:
a storage medium storing a medical image analysis program; and
at least one processor,
wherein the processor is configured to:
perform a first analysis process regarding a plurality of regions of interest included in a medical image;
receive an input for a first region of interest among the plurality of regions of interest;
perform a second analysis process regarding a second region of interest related to the first region of interest based on the input;
output an analysis result of the second region of interest;
receive, as the input, a comment on findings regarding the first region of interest;
select one analysis result from among a plurality of analysis results of the first analysis process regarding the first region of interest based on the comment on findings;
perform the second analysis process regarding the second region of interest for which an analysis result related to the one analysis result is obtained;
determine the second region of interest related to each of the plurality of regions of interest prior to receiving the input;
select the second region of interest related to the first region of interest from among the second regions of interest determined for each of the plurality of regions of interest based on the input; and
perform the second analysis process regarding the selected second region of interest, wherein the processor is further configured to
perform, as the second analysis process, a process of correcting a degree of certainty of the analysis result related to the one analysis result among a plurality of analysis results obtained by the first analysis process regarding the second region of interest,
perform, as the second analysis process, an analysis process regarding the second region of interest based on a partial image including the second region of interest of the medical image, the one analysis result, and a trained model trained in advance using training data including a partial image for learning and an analysis result of a region of interest included in the partial image for learning, and
in a case where a plurality of analysis results related to the one analysis result are present, select one analysis result from among the plurality of analysis results related to the one analysis result based on a co-occurrence probability of the one analysis result and each of the plurality of analysis results related to the one analysis result.

2. The medical image analysis apparatus according to claim 1,
wherein the processor is configured to
perform, as the second analysis process, the first analysis process by changing an analysis parameter for an analysis result related to an analysis result of the first region of interest.

3. The medical image analysis apparatus according to claim 1,
wherein the analysis result is a name, finding, comment on findings, or diagnosis name of the region of interest.

4. The medical image analysis apparatus according to claim 1,
wherein the processor is configured to,
in a case where a result of the second analysis process regarding the second region of interest is different from a result of the first analysis process, provide a notification that the result of the second analysis process is different from the result of the first analysis process.

5. The medical image analysis apparatus according to claim 1,
wherein the processor is configured to
determine the second region of interest related to the first region of interest based on the input, and perform the second analysis process regarding the determined second region of interest.

6. A medical image analysis method executed by a processor provided in a medical image analysis apparatus, the method comprising:
performing a first analysis process regarding a plurality of regions of interest included in a medical image;
receiving an input for a first region of interest among the plurality of regions of interest;
performing a second analysis process regarding a second region of interest related to the first region of interest based on the input;
outputting an analysis result of the second region of interest;
receiving, as the input, a comment on findings regarding the first region of interest;
selecting one analysis result from among a plurality of analysis results of the first analysis process regarding the first region of interest based on the comment on findings;
performing the second analysis process regarding the second region of interest for which an analysis result related to the one analysis result is obtained;
determining the second region of interest related to each of the plurality of regions of interest prior to receiving the input;
selecting the second region of interest related to the first region of interest from among the second regions of interest determined for each of the plurality of regions of interest based on the input; and
performing the second analysis process regarding the selected second region of interest,
wherein the method is further comprising
performing, as the second analysis process, a process of correcting a degree of certainty of the analysis result related to the one analysis result among a plurality of analysis results obtained by the first analysis process regarding the second region of interest,
performing, as the second analysis process, an analysis process regarding the second region of interest based on a partial image including the second region of interest of the medical image, the one analysis result, and a trained model trained in advance using training data including a partial image for learning and an analysis result of a region of interest included in the partial image for learning, and
in a case where a plurality of analysis results related to the one analysis result are present, selecting one analysis result from among the plurality of analysis results related to the one analysis result based on a co-occurrence probability of the one analysis result and each of the plurality of analysis results related to the one analysis result.

7. A non-transitory computer-readable storage medium storing a medical image analysis program for causing a processor provided in a medical image analysis apparatus to execute:
performing a first analysis process regarding a plurality of regions of interest included in a medical image;
receiving an input for a first region of interest among the plurality of regions of interest;
performing a second analysis process regarding a second region of interest related to the first region of interest based on the input;
outputting an analysis result of the second region of interest;
receiving, as the input, a comment on findings regarding the first region of interest;
selecting one analysis result from among a plurality of analysis results of the first analysis process regarding the first region of interest based on the comment on findings;
performing the second analysis process regarding the second region of interest for which an analysis result related to the one analysis result is obtained;
determining the second region of interest related to each of the plurality of regions of interest prior to receiving the input;
selecting the second region of interest related to the first region of interest from among the second regions of interest determined for each of the plurality of regions of interest based on the input; and
performing the second analysis process regarding the selected second region of interest,
wherein the method is further comprising
performing, as the second analysis process, a process of correcting a degree of certainty of the analysis result related to the one analysis result among a plurality of analysis results obtained by the first analysis process regarding the second region of interest, performing, as the second analysis process, an analysis process regarding the second region of interest based on a partial image including the second region of interest of the medical image, the one analysis result, and a trained model trained in advance using training data including a partial image for learning and an analysis result of a region of interest included in the partial image for learning, and in a case where a plurality of analysis results related to the one analysis result are present, selecting one analysis result from among the plurality of analysis results related to the one analysis result based on a co-occurrence probability of the one analysis result and each of the plurality of analysis results related to the one analysis result.

8. A medical image analysis apparatus comprising:
a storage medium storing a medical image analysis program; and
at least one processor,
wherein the processor is configured to:
perform an analysis process regarding a region of interest included in a medical image;
receive an input for correcting an analysis result of the region of interest;
perform the analysis process by changing an analysis parameter for an analysis result related to the corrected analysis result based on the input;
receive, as the input, a comment on findings regarding the first region of interest;
select one analysis result from among a plurality of analysis results of the first analysis process regarding the first region of interest based on the comment on findings;
perform the second analysis process regarding the second region of interest for which an analysis result related to the one analysis result is obtained;
determine the second region of interest related to each of the plurality of regions of interest prior to receiving the input;
select the second region of interest related to the first region of interest from among the second regions of interest determined for each of the plurality of regions of interest based on the input; and
perform the second analysis process regarding the selected second region of interest,
wherein the processor is further configured to
perform, as the second analysis process, a process of correcting a degree of certainty of the analysis result related to the one analysis result among a plurality of analysis results obtained by the first analysis process regarding the second region of interest,
perform, as the second analysis process, an analysis process regarding the second region of interest based on a partial image including the second region of interest of the medical image, the one analysis result, and a trained model trained in advance using training data including a partial image for learning and an analysis result of a region of interest included in the partial image for learning, and
in a case where a plurality of analysis results related to the one analysis result are present, select one analysis result from among the plurality of analysis results related to the one analysis result based on a co-occurrence probability of the one analysis result and each of the plurality of analysis results related to the one analysis result.

9. A medical image analysis method executed by a processor provided in a medical image analysis apparatus comprising a storage medium storing a medical image analysis program, the method comprising:
performing an analysis process regarding a region of interest included in a medical image;
receiving an input for correcting an analysis result of the region of interest;
performing the analysis process by changing an analysis parameter for an analysis result related to the corrected analysis result based on the input;
receiving, as the input, a comment on findings regarding the first region of interest;
selecting one analysis result from among a plurality of analysis results of the first analysis process regarding the first region of interest based on the comment on findings;
performing the second analysis process regarding the second region of interest for which an analysis result related to the one analysis result is obtained;
determining the second region of interest related to each of the plurality of regions of interest prior to receiving the input;
selecting the second region of interest related to the first region of interest from among the second regions of interest determined for each of the plurality of regions of interest based on the input; and
performing the second analysis process regarding the selected second region of interest,
wherein the method is further comprising
performing, as the second analysis process, a process of correcting a degree of certainty of the analysis result related to the one analysis result among a plurality of analysis results obtained by the first analysis process regarding the second region of interest,
performing, as the second analysis process, an analysis process regarding the second region of interest based on a partial image including the second region of interest of the medical image, the one analysis result, and a trained model trained in advance using training data including a partial image for learning and an analysis result of a region of interest included in the partial image for learning, and
in a case where a plurality of analysis results related to the one analysis result are present, selecting one analysis result from among the plurality of analysis results related to the one analysis result based on a co-occurrence probability of the one analysis result and each of the plurality of analysis results related to the one analysis result.

10. A non-transitory computer-readable storage medium storing a medical image analysis program for causing a processor provided in a medical image analysis apparatus to execute:
performing an analysis process regarding a region of interest included in a medical image;
receiving an input for correcting an analysis result of the region of interest;
performing the analysis process by changing an analysis parameter for an analysis result related to the corrected analysis result based on the input;
receiving, as the input, a comment on findings regarding the first region of interest;

selecting one analysis result from among a plurality of analysis results of the first analysis process regarding the first region of interest based on the comment on findings;

performing the second analysis process regarding the second region of interest for which an analysis result related to the one analysis result is obtained;

determining the second region of interest related to each of the plurality of regions of interest prior to receiving the input;

selecting the second region of interest related to the first region of interest from among the second regions of interest determined for each of the plurality of regions of interest based on the input; and performing the second analysis process regarding the selected second region of interest, wherein the medical image analysis program is further causing a processor to execute performing, as the second analysis process, a process of correcting a degree of certainty of the analysis result related to the one analysis result among a plurality of analysis results obtained by the first analysis process regarding the second region of interest, performing, as the second analysis process, an analysis process regarding the second region of interest based on a partial image including the second region of interest of the medical image, the one analysis result, and a trained model trained in advance using training data including a partial image for learning and an analysis result of a region of interest included in the partial image for learning, and in a case where a plurality of analysis results related to the one analysis result are present, selecting one analysis result from among the plurality of analysis results related to the one analysis result based on a co-occurrence probability of the one analysis result and each of the plurality of analysis results related to the one analysis result.

* * * * *